Oct. 11, 1960     R. L. WALL     2,956,186
LOW NOISE ROTOR FOR DYNAMOELECTRIC MACHINES
Filed July 31, 1957     2 Sheets-Sheet 1
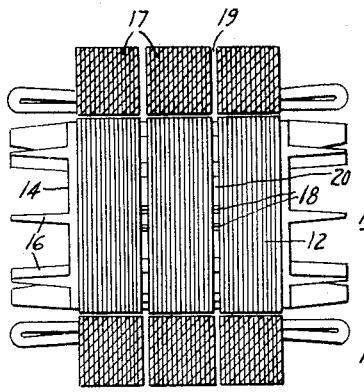
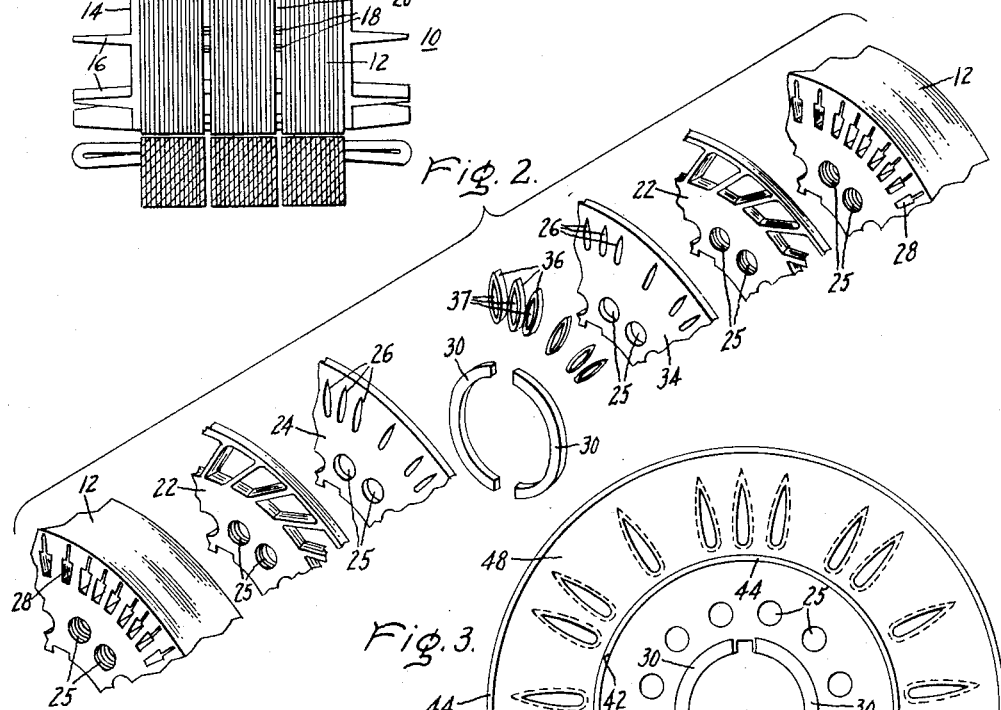
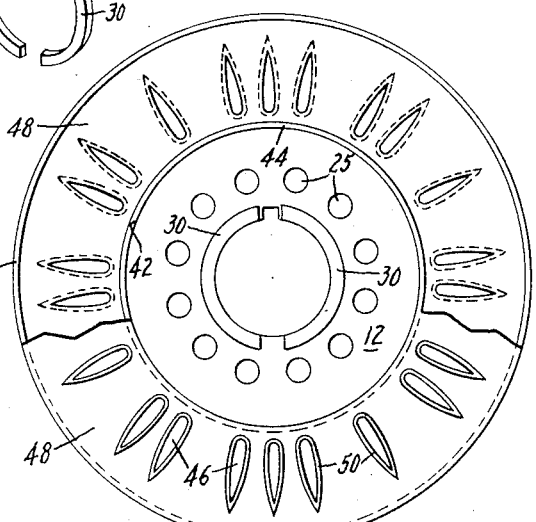
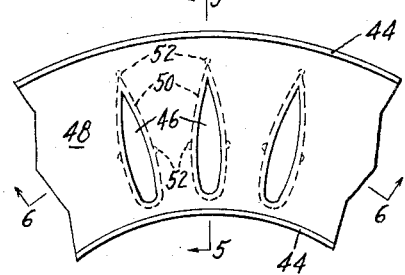
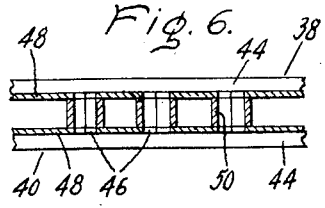
Inventor:
Robert L. Wall,
by Vernon F. Kalb
His Attorney.

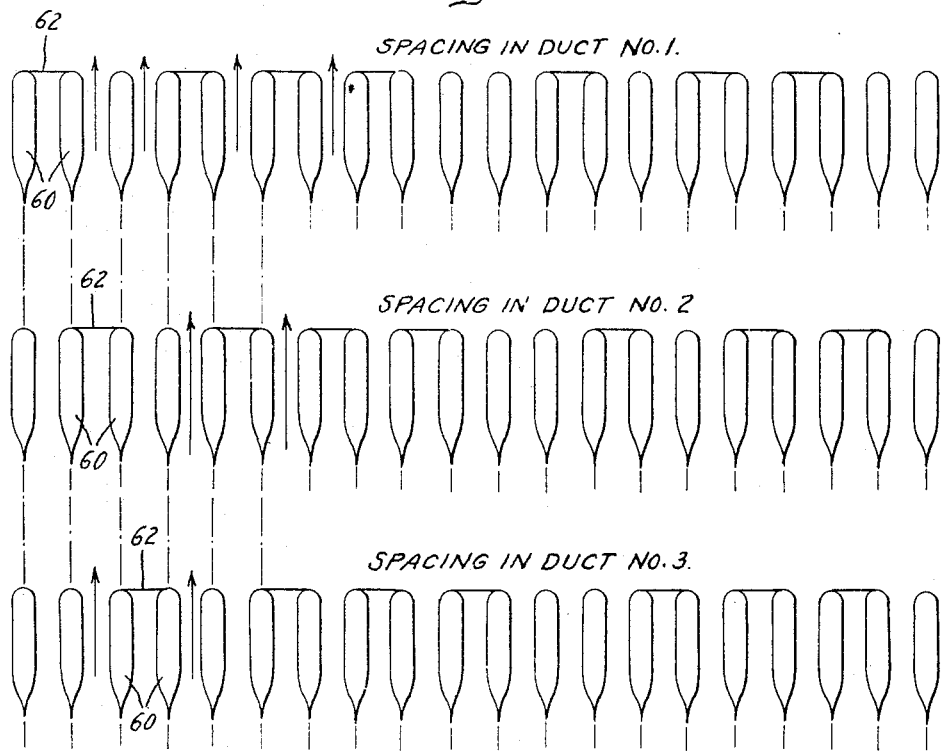

United States Patent Office 2,956,186
Patented Oct. 11, 1960

2,956,186

LOW NOISE ROTOR FOR DYNAMOELECTRIC MACHINES

Robert L. Wall, Schenectady, N.Y., assignor to General Electric Company, a corporation of New York Filed July 31, 1957, Ser. No. 675,385

10 Claims. (Cl. 310—65)

The invention described herein relates to dynamoelectric machines and more particularly to an improved rotor capable of decreasing noises generated by a motor during operation.

In the operation of a conventional motor having air ducts located in the peripheral surface of a rotor and aligned with matching air ducts in the stator, air is admitted axially through the rotor and discharged radially through the air ducts and across an air gap into the stator ducts prior to discharge from the machine. As the air crosses the air gap, rotor bars forming the ducts substantially close the stator air ducts thereby cutting off flow of ventilating air therethrough. The air chopping action or siren effect thus achieved causes an undesirable noise having a dominant frequency equal to the number of rotor bars times the rotor speed. Harmonics of the dominant frequencies also occur which, along with the dominant frequencies, fall within an audible range which preferably should be eliminated.

Various means have been resorted to in an attempt to eliminate the siren noises generated by the motor. In some instances, dissipative type mufflers have been installed in and adjacent to the motor frame for attenuating those sound frequencies deemed objectionable. In other cases, the source of noise, or those elements which are productive of noise, have been treated in an attempt to reduce the dominant and harmonic frequencies. In the latter cases, slot wedges having sections positioned across the ducts have been streamlined to reduce the degree of closing of the stator air ducts by the rotor bars located in the rotor ducts during operation of the machine. The design of the rotor bars also has been changed from a blunt end near the stator ducts to a rounded contour for the same purpose. The function served by these designs is to reduce the pressure fluctuations of air by permitting more air at a reduced velocity pressure to flow through the open stator air ducts and thereby reducing the magnitude of the pressure fluctuations that are the source of the noise. These treatments have not been wholly successful because the degree of audible noise remaining is deemed objectionable for many installations.

Considerable progress has been made in this direction by decreasing the number of rotor bars in the ducts, as compared with rotor conductor bars, and by locating them inwardly from the peripheral surface of the rotor in the manner as described and claimed in co-pending patent application of Philip L. Alger, Serial No. 632,528, filed January 4, 1957, and assigned to the same assignee as the present invention. Reduction of noise as described in the application is made possible by the novel use of intermediate end rings formed by window punchings in the rotor which permit the number and location of the rotor duct bars to be chasen independently of the rotor slots. A decrease in the dominant sound frequencies produced by the window punching motor is established, although noises generated in the harmonic frequency range are higher than those dominant frequencies from which they are derived.

Accordingly, the primary object of my invention is to provide for a reduction in motor noise output at its source by minimizing the siren effect produced by the rotating rotor and stationary stator thus making it extremely inefficient while simultaneously meeting the other requirements of electrical and mechanical machine design.

Another object of my invention is to provide an improved intermediate end ring rootr capable of permitting the use of any number and configuration of bars in a rotor air duct.

Briefly stated, I carry out the above objects of my invention by locating between adjacent stacks of punchings comprising the rotor, a spacer assembly shaped to provide a symmetrical and intermediate ring on each punching stack bridged by bars which form the air ducts centrally positioned in the rotor. A lesser number of bars can therefore be positioned in the rotor air ducts than are in the rotor laminations and spacing thereof made at irregular intervals. Noises thus emitted by the action of the rotor duct bars as they pass adjacent stator air ducts are reduced as the irregular spacing of the rotor duct bars eliminate the periodic pulsations of the air in the stator duct. This eliminates the dominant pure tone noise produced by motors with conventional rotors and produces minor noises of lesser intensity at other frequencies. The design of the bars in the rotor air ducts is made of various configurations compatible with acceptible aerodynamic air flow properties so as to reduce noises which otherwise are generated therein.

While the specification concludes with claims particularly pointing out and distinctly claiming the subject matter which I regard as my invention, it is believed the invention will be better understood from the following description taken in connection with the accompanying drawings in which:

Figure 1 is a view in elevation of a motor, partly in section, illustrating the arrangement of air ducts positioned between opposite ends thereof;

Figure 2 is an exploded view showing the relative disposition and arrangement of punchings and parts necessary for providing a rotor having radial air ducts;

Figure 3 is a view in elevation illustrating a modified arrangement of rotor bars utilized in forming the radial air ducts;

Figure 4 is an enlarged view in elevation of a plurality of rotor duct bars shown in Figure 3;

Figure 5 is a view taken on lines 5—5 of Figure 4;

Figure 6 is a view taken on lines 6—6 of Figure 4; and

Figure 7 is a modification illustrating an arrangement for closing off certain of the rotor air ducts for reducing the noise generated by the machine.

Referring now to the drawings wherein like reference characters designate like or corresponding parts throughout the several views, there is shown in Figure 1, a rotor 10 consisting of a plurality of stacks of laminations 12 enclosed between end rings 14 having fan blades 16 integrally formed therewith. The stator is of conventional design including stacks of laminations 17 spaced by radial air ducts 19. Each stack of rotor laminations 12 is spaced from one another and bridged by air duct bars 18 which serve to provide an air duct 20 therebetween for providing air to the stator portion of the machine. As the rotor rotates, air is drawn axially and inwardly thereof and discharged radially through the air ducts 20 for distribution to the air ducts 19 provided in the stator prior to discharge from the machine. As the rotor bars cross the stator air ducts, they cut off the supply of air normally provided therethrough and a sound frequency is thus generated in a range equal to the number of rotor bars times the rotor speed. This frequency is in an audible range and generates a pure tone noise which is objectionable.

In order to eliminate this undesirable noise, the rotor is assembled in the manner illustrated in Figure 2 which shows an exploded view of the various sections of punchings and parts necessary in providing the air duct rotor utilized for ventilating and carrying away heat generated during machine operation. As shown, the conductor bar sections or stacks of laminations 12 and window punching sections 22 are adapted for installation on a shaft in a usual manner. In order to provide a structure wherein air may be carried axially through the rotor and then discharged radially through the outer surface to the stator, a plurality of bored holes 25 are provided in the laminations comprising the rotor. Obviously, holes 25 may be eliminated when rotors having laminations mounted on a spider are used. In addition to the conductor bar punchings 12 and window punchings 22, a third section of punching 24 having elongated slots 26 is fixed on the shaft and adjacent the window punchings 22. Depending on the size of the machine and the degree of ventilation required, slots 26 may be varied in size and/or number to obtain the desired number of bars crossing the air duct. As shown in Figure 2, the slots usually are of lesser number than the conductor slots 28 in the punchings 12. They may be of the same radial height as shown or they may be made considerably deeper with advantage in some cases. A split spacer ring 30 may be provided for snug mounting on the shaft so as to space punching section 24 from its identical counterpart 34 which, after installation, is located on the other side of the ring. As is evident, since there is a distance between the adjacent sections 24 and 34, it is necessary to provide communication between the slots 26 located near the peripheral surface of the special punching sections 24 and 34.

This is accomplished by utilizing a plurality of steel tubes or spacing sleeves 36 shown in Figure 2, each of which is designed with an opening 37 to accurately mate with the slots 26 provided in each of the punching sections 24 and 34. The spacing sleeves illustrated are generally of teardrop design with the narrow portion located on the side where air leaves the rotor. Each disc 36 is also provided with smooth side surfaces arranged to closely engage their respective laminations. The close fit is necessary to prevent molten aluminum escaping from the confined passages of the rotor during a casting process. In most constructions, the spacing sleeves 36 are permanently installed between single punchings of the type shown at 24 and 34 so as to permit insertion of these assembled parts as a unit and thereby facilitate construction of the rotor. However, they may be made removable with advantage, particularly in small size rotors where it is desirable to have small duct bars. In addition to the teardrop shape shown, other shapes may be employed for reducing the duct noise. For example, the ends adjacent the air gap may be rounded in a manner to provide bars of varying height and they may be located inwardly at irregular intervals from the air gap to provide an unsymmetrical design.

After the various parts and sections of laminations have been assembled and the casting process completed, a space forming the rotor air ducts 20 is provided between adjacent adapter discs 36. Ventilating air is therefore supplied through passageways 25 and radially out through the air ducts 20 to the stator air ducts located on the other side of the air gap in the machine. It has been found that in some cases, it is convenient to either reduce or increase the thickness of spacer ring 30 and the accompanying outer sleeves in order to obtain the desired attenuation of sound frequencies issuing from the machine. Obviously, the axial thickness of spacer ring 30 and the spacing sleeves 36 are the same in order to confine the aluminum to the channels provided therein during the casting process.

The embodiment illustrated in Figures 3–6 is intended to replace many of the parts heretofore required in the window punching rotor. Referring to Figure 2, the parts to be supplanted are those appearing between stacks of punchings 12—12 except for spacer ring 30. This is accomplished by the use of spacer assembly 37 illustrated in Figures 3–6. The assembly comprises a pair of rings 38 and 40 provided with a central opening 42 and equipped with inner and outer flanges 44. Openings 46 of teardrop configuration are punched in a wall 48 of the ring and spaced at intervals as shown in Figure 3. In order to connect the two rings together, they are placed in parallel relaionship with the openings 46 aligned with one another. Spacers 50, also of teardrop configuration and of slightly larger size than the openings, are placed between the rings and in alignment with such openings and tack welded at 52 to the facing portions of the rings. Spacer ring 30 is located inwardly of the spacers 50 to prevent the central portions of punchings 12 from bulging inwardly when the assembled rotor parts are placed under pressure.

A spacing assembly 37 is thus provided which is arranged to have the flanges 44 abut their respective punchings 12—12. When molten aluminum is poured to form the rotor winding, it flows through the conductor slots 28 and into the area defined by the flanges 44 and punchings 12. This is a continuous open area around the rotor which when filled, constitutes the intermediate end ring for the rotor. Continued movement of the molten aluminum fills the spacers 50 and opposite area defined by flanges 44 and punchings 12 to form a second intermediate ring prior to filling the conductor slots in the other stack of punchings 12. Upon completion of the casting process, it will be seen that the conductor bars in slots 28 in each punching stack merge into their respective intermediate end rings. The rings are joined by the spacers 50 of teardrop configuration. It is evident that the spacers 50 form the rotor air duct bars with the spaces therebetween being utilized for flow of air outwardly to the stator air ducts. In addition to providing for reduction in the noise level as hereinafter described, the rotor contains those desirable electrical characteristics fully described and illustrated in the above-mentioned Alger patent application.

As illustrated in Figure 3, the duct bars may be randomly spaced with respect to one another in order to have them cross the stator air ducts at varying time intervals and thereby reduce the pure tone noise due to the siren effect of the rotor air duct bars closing the air ducts in the stator. A particular advantage derived from this construction is that there is an elimination of concentration of energy at one point as in prior machines. The energy is dispersed or spread out thereby reducing the amplitude of any one particular frequency. When the bars are not randomly spaced, a pure tone noise is produced which contains a peak at dominant and harmonic frequencies which is avoided by the invention described herein. As a result, a pressure wave is produced having an amplitude considerably less than that normally shown by the peaks referred to above.

It has been found that in addition to randomly spacing the bars, they preferably should be shaped to the configuration of a teardrop so as to provide a smaller velocity pressure at the point of discharge from the duct and which is more evenly distributed between two adjacent bars. The effect of this construction is to reduce the magnitude of sound frequencies generated by the air ducts and because the air pressure drops off toward adjacent bars at a more uniform rate, the aerodynamic losses are reduced. The concept is to reduce the sound pressure level as indicated above, and constructions other than that shown may be resorted to for this purpose. For example, the bars may assume a long narrow configuration, or they may be short or of reverse teardrop design.

In some embodiments there may be a plurality of rows of ducts spaced along the length of the rotor with the rotor bars in each row crossing the air ducts at equally spaced intervals. In order to reduce the sound frequencies normally associated with this type of construction, various sets of adjacent bars may be closed to the air gap as illustrated in Figure 7. As shown, the rotor bars 60 are all of substantially the same shape and are positioned in a manner to provide a cap 62 bridging the adjacent sets of bars chosen. For example, the caps bridging adjacent bars in each of three ducts are chosen at irregular intervals to require the air to leave the rotor at irregular sequences with respect to a fixed point thereby reducing the sequential pressure pulses and tending to prevent the production of a dominant pure tone noise. The spacing in the ducts is such that corresponding points in the stator ducts do not receive pressure pulses at the same instant. Since window punchings or the spacer assemblies described herein are employed throughout, fewer air duct bars, than conductor bars may be used, with the window punchings providing for the transition between the number of bars in the ducts and in the laminations. Also, it will be evident that bars in these ducts may be spaced at irregular intervals as previously described so as to eliminate the periodic air pressure pulses from the rotor and thereby making it impossible to form single tone noises.

The invention so far described has been directed to a squirrel cage rotor but the principles are equally applicable to copper bar rotors wherein the copper bars are physically placed in rotor slots, as distinguished from the casting process normally associated with squirrel cage rotors. The embodiment shown in Figure 7 is also susceptible of application to this type of rotor and the function of preventing periodic pressure pulses at any point in the stator ducts is the same. In the event more than one ring or band of ducts is employed in the motor, the closed off openings would be skewed with respect to each other to disturb the phase relationship of the pressure pulses in the ducts. The radiating efficiency of a dipole source is much less than that of a monopole source and the effect achieved from utilizing this kind of arrangement is that the monopole noise source is changed to a dipole noise source.

In view of the above, it will be evident that many modifications and variations are possible in light of the above teachings. It therefore is to be understood that within the scope of the appended claims, the invention may be practiced otherwise than as specifically described.

What I claim as new and desire to secure by Letters Patent of the United States is:

1. A dynamoeletric machine comprising a stator and a rotor having a plurality of sections of laminations including conductor receiving slots and air ducts extending radially of the rotor and opening into the air gap of the machine, said stator having a set of air ducts oppositely disposed from said rotor air ducts for receiving ventilating air provided through said rotor and discharged from the latter during machine operation, a winding in said rotor, said rotor air ducts comprising a plurality of spaced bars interconnecting the portions of said winding in said sections and bridging a space therebetween, said bars being spaced around said rotor in a manner to preclude the generation of periodic air pressure pulses when the rotor air duct bars pass the stator air duct openings and thereby prohibit the creation of dominant single tone noise.

2. The combination according to claim 1 wherein said rotor bars are of teardrop configuration.

3. A dynamoelectric machine capable of operation at low noise levels comprising a stator and a rotor respectively provided with laminated cores having aligned air ducts extending radially therethrough, an axial passageway in said rotor core connected with said rotor air ducts for permitting ventilating air to flow axially through said rotor prior to discharge through its air ducts into the air ducts of said stator, said rotor air ducts comprising a plurality of axially extending members bridging adjacent sections of the rotor core and thereby providing air spaces therebetween, a winding in said rotor core having a portion thereof in each of said sections and in said members for electrically connecting the winding portions with each other, said members in said rotor being spaced from one another at irregular intervals to preclude the generation of periodic air pressure pulses and accompanying single tone noises.

4. A dynamoelectric machine capable of operation at low noise levels comprising stator and rotor cores made of a plurality of sections of laminations and having windings therein, axially extending ventilating air passageway means in said rotor, radial air ducts in said rotor connected at one end with said air passageway means and terminating at their other ends in an air gap for the machine, said rotor air ducts comprising a plurality of spaced bars extending around said core and bridging said adjacent sections of laminations, said stator having air ducts in alignment with the air ducts of said rotor, means peripherally bridging certain of said rotor bars to close the air duct therebetween so as to prevent periodic pressure pulses in said stator ducts.

5. A dynamoelectric machine capable of operation at low noise levels comprising stator and rotor cores having windings therein and having radially extending air ducts between the ends of said cores and positioned in radial alignment with each other, a longitudinal passageway in said rotor communicating with said rotor air ducts for providing ventilating air through said rotor and stator air ducts, said rotor air ducts comprising a plurality of spaced bars bridging adjacent sections of laminations in the rotor and providing air spaces therebetween through which the ventilating air flows prior to discharge to said stator air ducts, said bars being spaced equal distances from each other around the rotor periphery, means bridging adjacent bars in said rotor at predetermined intervals for closing the respective air ducts so as to require the ventilating air to leave the rotor at irregular intervals thereby preventing the production of pure tone noises when the rotor bars pass the stator air ducts during machine operation.

6. The combination according to claim 5 wherein said means bridging said adjacent bars in the rotor are located in a manner to obtain skewing of air ducts along the length of the rotor so as to disturb the phase relationship of the noises generated to achieve partial cancellation of sound waves.

7. A dynamoelectric machine capable of operation at low noise levels comprising a stator and a rotor respectively provided with laminated cores having aligned air ducts extending radially therethrough, an axial passageway in said rotor core connected with said rotor air ducts for permitting ventilating air to flow axially through said rotor prior to discharge through its air ducts into the air ducts of said stator, said rotor comprising a pair of stacks of laminations having conductor slots therein and being separated by a spacing assembly comprising a pair of rings respectively placed over said conductor slots and in contact with oppositely disposed laminations in said rotor core, a plurality of individual hollow spacers bridging said rings so that when a winding is cast in said rotor core, the cast material fills said rings and spacers to provide intermediate end rings in said rotor bridged by air duct bars formed by said spacers.

8. A dynamoelectric machine comprising a stator and a rotor, said rotor comprising a pair of stacks of laminations spaced from each other axially to provide radial air ducts, a longitudinal air passageway extending the length of said rotor and communicating with said air ducts for supplying ventilating air to the machine, a winding in said rotor comprising a plurality of conductor bars terminating at their midpoints in intermediate end rings, one side of each of said end rings respectively being in contact with a surface of the laminations in each of said stacks facing said air ducts, and bars bridging said end rings in a manner to permit air to flow radially past the bars and into air ducts provided in said stator.

9. The combination according to claim 7 wherein said duct bars are spaced at irregular intervals in said air duct.

10. The combination according to claim 7 wherein said duct bars are spaced inwardly from the conductor bars in said rotor core.

References Cited in the file of this patent

UNITED STATES PATENTS

| | | |
|---|---|---|
| 933,737 | Baird | Sept. 14, 1909 |
| 1,179,030 | Pearson | Apr. 11, 1916 |
| 2,413,525 | Smith | Dec. 31, 1946 |
| 2,648,788 | Fleischer | Aug. 11, 1953 |

FOREIGN PATENTS

| | | |
|---|---|---|
| 169,035 | Austria | Oct. 10, 1951 |
| 423,153 | Great Britain | Jan. 25, 1935 |
| 728,958 | Great Britain | Apr. 27, 1955 |